(12) United States Patent
Barton et al.

(10) Patent No.: US 11,624,800 B1
(45) Date of Patent: *Apr. 11, 2023

(54) BEAM REJECTION IN MULTI-BEAM MICROPHONE SYSTEMS

(71) Applicant: Amazon Technologies, Inc., Seattle, WA (US)

(72) Inventors: William Folwell Barton, Harvard, MA (US); Kenneth Edgar Hild, II, Cupertino, CA (US); Ramya Gopalan, Cupertino, CA (US); Kavitha Velusamy, San Jose, CA (US); Amit Singh Chhetri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,093

(22) Filed: Oct. 14, 2021

Related U.S. Application Data

(63) Continuation of application No. 16/925,046, filed on Jul. 9, 2020, now Pat. No. 11,175,372, which is a
(Continued)

(51) Int. Cl.
*H05H 3/06* (2006.01)
*G01S 3/808* (2006.01)
(Continued)

(52) U.S. Cl.
CPC ............ *G01S 3/8083* (2013.01); *G01S 3/805* (2013.01); *G01S 3/86* (2013.01); *G01S 5/22* (2013.01);
(Continued)

(58) Field of Classification Search
CPC .......... G01S 3/8083; G01S 3/805; G01S 3/86; G01S 5/22; H04R 25/407; H04R 2430/20;
(Continued)

(56) References Cited

U.S. PATENT DOCUMENTS 7,418,392 B1    8/2008    Mozer et al.
7,720,683 B1    5/2010    Vermeulen et al.
(Continued)

FOREIGN PATENT DOCUMENTS

WO    WO2011088053 A2    7/2011

OTHER PUBLICATIONS

Office Action for U.S. Appl. No. 15/601,981, Barton, "Beam Rejection in Multi-Beam Microphone Systems", 15 Pages.
(Continued)

*Primary Examiner* — Ammar T Hamid
(74) *Attorney, Agent, or Firm* — Lee & Hayes, P.C.

(57) ABSTRACT

The systems, devices, and processes described herein may identify a beam of a voice-controlled device that is directed toward a reflective surface, such as a wall. The beams may be created by a beamformer. An acoustic echo canceller (AEC) may create filter coefficients for a reference sound. The filter coefficients may be analyzed to identify beams that include multiple peaks. The multiple peaks may indicate presence of one or more reflective surfaces. Using the amplitude and the time delay between the peaks, the device may determine that it is close to a reflective surface in a direction of the beam.

20 Claims, 9 Drawing Sheets

Related U.S. Application Data continuation of application No. 15/601,981, filed on May 22, 2017, now Pat. No. 10,746,840, which is a continuation of application No. 13/857,040, filed on Apr. 4, 2013, now Pat. No. 9,689,960.

(51) Int. Cl.

| | | |
|---|---|---|
| *G01S 5/22* | (2006.01) | |
| *G01S 3/805* | (2006.01) | |
| *G01S 3/86* | (2006.01) | |
| *H04R 3/00* | (2006.01) | |
| *H04R 25/00* | (2006.01) | |

(52) U.S. Cl.
CPC ........ *H04R 25/407* (2013.01); *H04R 2430/20* (2013.01)

(58) Field of Classification Search
CPC .......... H04R 1/086; H04R 1/025; H04R 3/00; H04R 2420/07; G06F 3/165; G10H 1/361; G10H 2210/005; G10L 21/013; G10L 2021/0135
USPC ............................ 367/119; 381/101, 103, 92
See application file for complete search history.

(56) References Cited

U.S. PATENT DOCUMENTS

| | | | |
|---|---|---|---|
| 7,774,204 | B2 | 8/2010 | Mozer et al. |
| 8,213,596 | B2 | 7/2012 | Beaucoup et al. |
| 9,294,860 | B1 | 3/2016 | Carlson |
| 9,689,960 | B1 | 6/2017 | Barton et al. |
| 10,746,840 | B1 | 8/2020 | Barton et al. |
| 11,175,372 | B1 * | 11/2021 | Barton ................. G01S 3/86 |
| 2003/0118200 | A1 | 6/2003 | Beaucoup et al. |
| 2008/0285772 | A1 | 11/2008 | Haulick et al. |
| 2010/0171662 | A1 | 7/2010 | Sugiyama |
| 2012/0203557 | A1 | 8/2012 | Odinak |
| 2012/0223885 | A1 | 9/2012 | Perez |
| 2013/0039504 | A1 | 2/2013 | Pandey et al. |
| 2013/0325484 | A1 | 12/2013 | Chakladar et al. |
| 2014/0058732 | A1 | 2/2014 | Labsky et al. |
| 2014/0270217 | A1 | 9/2014 | Ivanov et al. |
| 2014/0314261 | A1 | 10/2014 | Selig et al. |
| 2015/0046157 | A1 | 2/2015 | Wolff et al. |
| 2016/0119705 | A1 | 4/2016 | Ramirez |
| 2016/0295340 | A1 | 10/2016 | Baker et al. |
| 2016/0322045 | A1 * | 11/2016 | Hatfield ............. G10L 21/0216 |
| 2018/0047408 | A1 | 2/2018 | Wolff et al. |
| 2018/0060430 | A1 | 3/2018 | Lu |

OTHER PUBLICATIONS

Final Office Action dated Nov. 16, 2018 for U.S. Appl. No. 15/601,981 "Beam Rejection in Multi-Beam Microphone Systems" Barton, 11pages.

Office action for U.S. Appl. No. 15/601,981, dated Apr. 24, 2018, Barton et al., "Beam Rejection in Multi-Beam Microphone Systems", 12 pages.

Office action for U.S. Appl. No. 13/857,040, dated Apr. 7, 2016, Barton et al., "Beam Rejection in Multi-beam Microphone Systems", 7 pages.

Office Action for U.S. Appl. No. 15/601,981, dated May 1, 2019, Barton, "Beam Rejection in Multibeam Microphone Systems", 15 pages.

Office Action for U.S. Appl. No. 16/925,046, dated Jun. 9, 2021, Barton, "Beam Rejection in Multi-Beam Microphone Systems", 14 pages.

Office action for U.S. Appl. No. 13/857,040, dated Sep. 30, 206, Barton et al., "Beam Rejection in Multi-beam Microphone Systems", 8 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

BEAM REJECTION IN MULTI-BEAM MICROPHONE SYSTEMS

CROSS-REFERENCE TO RELATED APPLICATIONS

This application is a continuation of and claims priority to U.S. patent application Ser. No. 16/925,046, filed Jul. 9, 2020, which is a continuation of and claims priority to U.S. patent application Ser. No. 15/601,981, filed May 22, 2017, now U.S. Pat. No. 10,746,840, patented Aug. 18, 2020, which is a continuation of and claims priority to U.S. patent application Ser. No. 13/857,040, filed Apr. 4, 2013, now U.S. Pat. No. 9,689,960, patented Jun. 27, 2017, which are incorporated herein by reference in their entirety.

BACKGROUND

Homes, offices, and public spaces are becoming more wired and connected with the proliferation of computing devices such as notebook computers, tablets, entertainment systems, and portable communication devices. As computing devices evolve, the way in which users interact with these devices continues to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that capture human speech and other sounds using microphones. When interacting with a computing device using speech, the computing device may perform automatic speech recognition (ASR) on audio signals generated from sound captured within an environment for the purpose of identifying voice commands within the signals.

Some computing devices may employ multiple microphones so that beamforming techniques may be used to isolate sound in particular directions. When a computing device is placed near the middle of a room, reflections of sounds off walls may not impact performance. However, when the computing device is placed near a wall or other surface that causes audio reflection, it may be desirable to modify use of the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure generally pertains to operation of an audio computing device that includes a microphone array, a beamforming system, and at least one speaker. The device may be used to select or deselect beams formed by the beamforming system from audio signals captured by the microphone array. The selecting/deselecting of the beams may be performed to avoid selection of a beam that is near or directed toward a wall or other reflective surface. User interaction with the device may be improved by employing a beam selection logic that does not select beams that are near and are directed toward a reflective surface.

In some embodiments, the systems and/or processes may compare filter coefficients from an acoustic echo canceller (AEC) for each beam to identify beams that are facing a reflective surface. For a beam that is facing a reflective surface, the AEC filter coefficients may include multiple peaks that may indicate presence of one or more reflective surfaces which cause the beam to capture the reference sound at different times represented by the multiple peaks (e.g., sound from direct path, sound from first reflective path, etc.). The time between the peaks may correspond to a distance between the reflective surface and the device. When the time between the peaks is less than a threshold amount of time, the device may be assumed to be within a threshold distance of a reflective surface in the direction of the beam having the filter coefficients that include multiple peaks. As discussed above, that beam may then be excluded, at least temporarily, from use in certain circumstances. For example, the beam may be excluded from use when employing beam selection logic to select a beam for use to process an audio signal received by the device.

In various embodiments, signal processing techniques may be used to improve the detection of the reflection of the reference signal. For example, when the device is used in a noisy environment, the microphones may capture the reference sound and also other sounds, such as human voices, music, environmental noises, etc. The systems and/or processes may perform various techniques with respect to an audio signal that is output in response to capturing sound, such as beamforming (e.g., spatio-temporal filtering), echo cancellation (e.g., acoustic echo, local echo, etc.), noise reduction, and so forth.

The techniques and systems described herein may be implemented in a number of ways. Example implementations are provided below with reference to the following figures.

Figure 1:
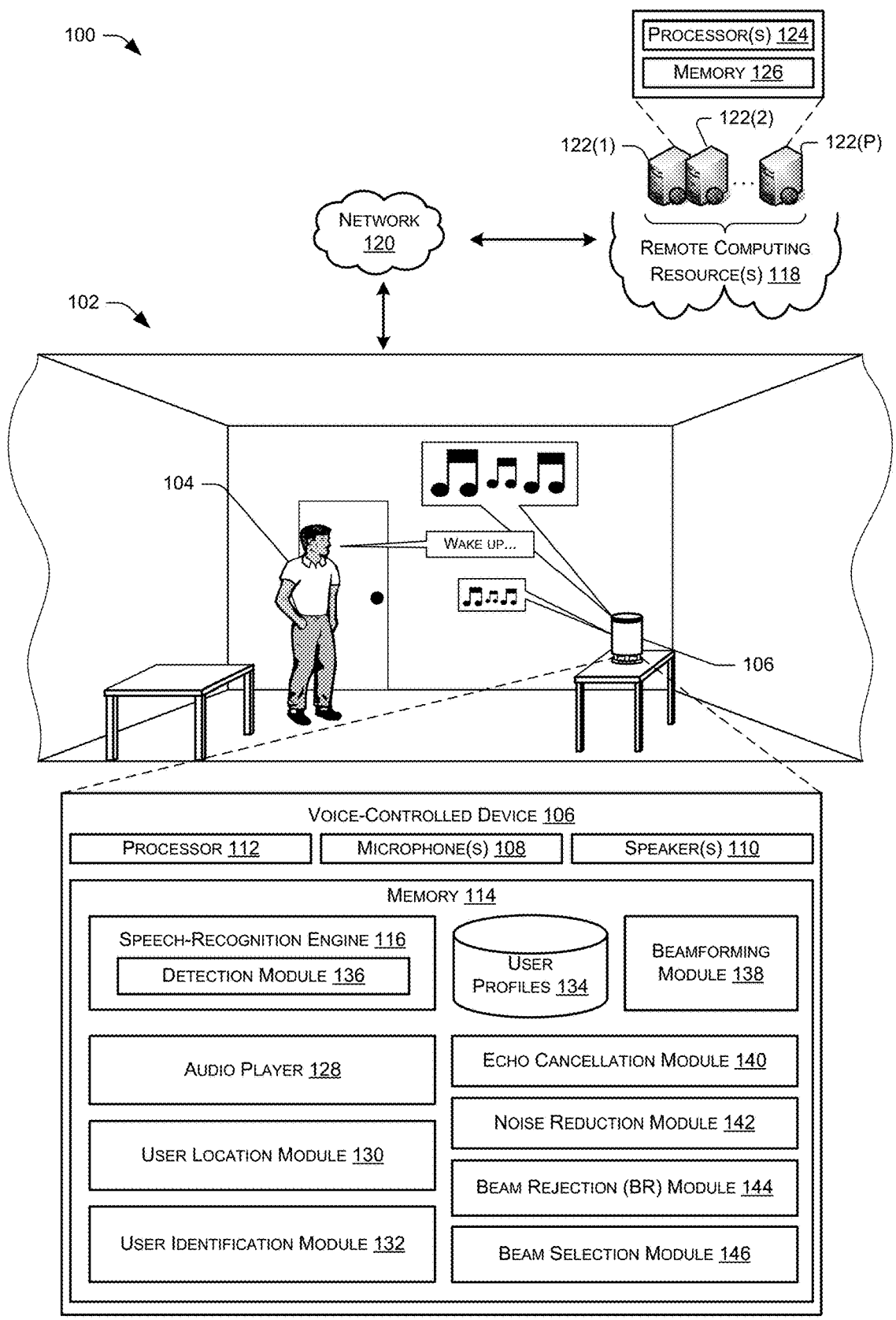
FIG. 1 is a schematic diagram of an illustrative voice interaction computing architecture that includes a voice-controlled device situated in an environment.

FIG. 1 shows an illustrative voice interaction computing architecture 100 set in an environment 102, such as a home environment, that includes a user 104. The architecture 100 also includes an electronic voice-controlled device 106 (interchangeably referred to as "device 106") with which the user 104 may interact. In the illustrated implementation, the voice-controlled device 106 is positioned on a table within a room of the environment 102. In other implementations, it may be placed in any number of locations (e.g., ceiling, wall, in a lamp, beneath a table, under a chair, etc.). Further, more than one device 106 may be positioned in a single room, or one device 106 may be used to accommodate user interactions from more than one room.

Generally, the voice-controlled device 106 may have a microphone unit that includes multiple microphones 108 and a speaker unit that includes at least one speaker 110 to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 2.

The microphone(s) 108 of the voice-controlled device 106 may detect audio (e.g. audio signals) from the environment 102, such as sounds uttered from the user 104, other noise within the environment 102, and/or acoustic echo within the environment 102 that is associated with the audio of a speaker associated with the voice-controlled device 106. As illustrated, the voice-controlled device 106 may include a processor 112 and memory 114, which stores or otherwise has access to a speech-recognition engine 116. As used herein, the processor 112 may include multiple processors and/or a processor having multiple cores. The speech-recognition engine 116 may perform speech recognition on audio signals generated by the microphone(s) 108, with these signals being generated from sound within the environment 102, such as utterances spoken by the user 104. The voice-controlled device 106 may perform certain actions in response to recognizing different speech from the user 104. The user 104 may speak predefined commands (e.g., "Awake", "Sleep", etc.), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors 112, storage, software, data access, and so forth that is maintained and accessible via a network 120 such as the Internet. The remote computing resources 118 may not require end-user knowledge of the physical location and configuration of the system that delivers the services. Common expressions associated for these remote computing resources 118 may include "on-demand computing", "software as a service (SaaS)", "platform computing", "network-accessible platform", "cloud services", "data centers", and so forth.

The servers 122(1), 122(2), . . . , 122(P) may include processor(s) 124 and memory 126, which may store or otherwise have access to some or all of the components described with reference to the memory 114 of the voice-controlled device 106. For instance, the memory 126 may have access to and utilize the speech-recognition engine 116 for receiving audio signals from the device 106, recognizing, and differentiating between, speech and other noise and, potentially, causing an action to be performed in response. In some examples, the voice-controlled device 106 may upload audio data to the remote computing resources 118 for processing, given that the remote computing resources 118 may have a computational capacity that exceeds the computational capacity of the voice-controlled device 106. Therefore, the voice-controlled device 106 may utilize the speech-recognition engine 116 at the remote computing resources 118 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 118 may perform speech recognition to interpret a user's 104 operational request or command. The requests may be for essentially any type of operation, such as authentication, database inquires, requesting and consuming entertainment (e.g., gaming, finding and playing music, movies or other content, etc.), personal management (e.g., calendaring, note taking, etc.), online shopping, financial transactions, and so forth. The speech recognition engine 116 may also interpret noise and/or acoustic echo detected by the microphone(s) 108 and determine that the noise/acoustic echo is not from the target source (e.g., the user 104). To interpret the user's 104 speech or other sounds (e.g. a reference sound generated by the speaker(s) 110, an adaptive filter associated with the speech recognition engine 116 may make a best estimate (e.g., mean square error, etc.) between the target sound (e.g., reverence sound, voice of the user 104, etc.) and acoustic echo and other noise within the environment 102 (e.g., other voices, audio from a television, background sounds from a kitchen, etc.). As a result, the adaptive filter may be configured to enhance the target sound while suppressing both ambient noise that is detected within the environment 102 and the acoustic echo that is generated within the environment 102.

The voice-controlled device 106 may communicatively couple to the network 120 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 120 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

As illustrated, the memory 114 of the voice-controlled device 106 may also store or otherwise has access to the speech recognition engine 116, an audio player 128, a user location module 130, a user identification module 132, and one or more user profiles 134. Although not shown, in other embodiments, the speech recognition engine 116, the audio player 128, the user location module 130, the user identification module 132, and the one or more user profiles 134 may be maintained by, or associated with, one of the remote computing resources 118. The audio player 128 may function to output any type of content on any type of output component of the device 106. For instance, the audio player 128 may output audio of a video or standalone audio via the speaker(s) 110. For instance, the user 104 may interact (e.g., audibly) with the device 106 to instruct the audio player 128 to cause output of a certain song or other audio file.

The user location module 130 may function to identify a location of the user 104 within the environment 102, which may include the actual location of the user 104 in a two-dimensional (2D) or a three-dimensional (3D) space, a distance between the user 104 and the device 106, a direction of the user 104 relative to the device 106, or the like. The user location module 130 may determine this location information in any suitable manner. In some examples, the device 106 includes multiple microphones 108 that each generates an audio signal based on sound that includes speech of the user 104 (e.g., the user 104 stating "wake up" to capture the device's 106 attention). In these instances, the user location module 130 may utilize time-difference-of-arrival (TDOA) techniques to determine a distance of the user 104 from the device 106. That is, the user location module 130 may cross-correlate the times at which the different microphones 108 received the audio to determine a location of the user 104 relative to the device 106 and, hence, a distance between the user 104 and the device 106.

The user identification module 132 may utilize one or more techniques to identify the user 104. In some instances, the user identification module 132 may work with the speech recognition engine 116 to determine a voice print of the user 104 and, thereafter, may identify the user 104 based on the voice print. In examples where the device 106 includes a camera, the user identification module 132 may utilize facial recognition techniques on images captured by the camera to identify the user 104. In still other examples, the device 106 may engage in a back-and-forth dialogue to identify and authenticate the user 104. Of course, while a few examples have been listed, the user identification module 132 may identify the user 104 in any other suitable manner.

After identifying the user 104, the device 106 (e.g., the user identification module 132, etc.) may reference a corresponding user profile 134 of the identified user 104 to determine how to alter the output of the audio. For instance, one user 104 may have configured the device 106 to pause the audio, while another user 104 may have configured the device 106 to attenuate the audio. In other instances, the device 106 may itself determine how best to alter the audio based on one or more characteristics associated with the user 104 (e.g., a general volume level or frequency of the user's 104 speech, etc.). In one example, the device 106 may identify a particular frequency range associated with the identified user 104 and may attenuate that frequency range in the audio being output.

In various embodiments, the speech-recognition module 116 may include, or be associated with, a detection module 136, a beamforming module 138, an echo cancellation module 140, a noise reduction module 142, a beam rejection module 144, and a beam selection module 146. The detection module 136 may be associated with the microphones 108 of the voice-controlled device 106 and may detect audio or other signals (e.g., electrical signals) within the environment 102. For instance the detection module 136 may detect a reference sound generated by the speakers 110, a voice from a target user 104, ambient or background noise within the environment 102, and/or acoustic echo associated with the detected voice that exists within the environment 102.

In some embodiments, the beamforming module 138 may perform beamforming or spatio-temporal filtering with respect to audio signals that are associated with the captured audio and that are output by the microphones 108.

The echo cancellation module 140 may remove echo associated with an audio signal for the purpose of improving the quality of the audio signal. In some embodiments, the echo cancellation module 140 may serve as an acoustic echo cancellation (AEC) module. In various embodiments, the echo cancellation module 140 may cancel the sound being played by the speaker 110 (and reflections of that sound off walls or other reflective surfaces) from the signal that is generated by the microphones 108. By cancelling the sound being played by the device 106, the device may be able improve the processing of commands received by the user 104. The echo cancelation module 140 may generate filter coefficients that may be used to cancel or subtract noises, such as echo, noise generated by the speakers 110, etc. The filter coefficients may be generated for each of multiple beams of a beamformer.

The noise reduction module 142 may reduce the amount of ambient noise received from the environment 102 and that is presented in the outputted audio signal. For instance, the noise reduction module 142 may suppress or reduce the amount of background noise (e.g., other voices, television noise, traffic noise, etc.) that is associated with the audio signal such that a reference sound, the voice of a particular user 104, or another sound associated with the audio signal is enhanced.

The beam rejection module 144 may identify a beam that is facing a reflective surface, such as a wall, a window, a lamp, a bookcase, etc. The beam rejection module 144 may compare filter coefficients from an acoustic echo canceller (e.g., the echo cancellation module 140) for each beam to identify beams that include multiple peaks from a reference sound generated by the speaker(s) 110 of the device 106. The beam rejection module 144 may then determine an amplitude of the peaks and a time between the peaks for a beam. The beam rejection module 144 may use the time between the peaks to determine a distance between the device and the reflective surface that causes at least one of the peaks.

The beam selection module 146 may receive an output from the BR module 144, and may cause exclusion of one or more beams, at least temporarily, from use in certain circumstances when the distance between the device and the reflective surface is less than a threshold distance (or when the time between the peaks is less than a threshold amount of time). For example, the beam rejection module 144 may transmit a signal to the beam selection module 146 that, in response to receipt of the signal, excludes the beam from use when employing beam selection logic to select a beam for use to process an audio signal received by the device 106.

Figure 2:
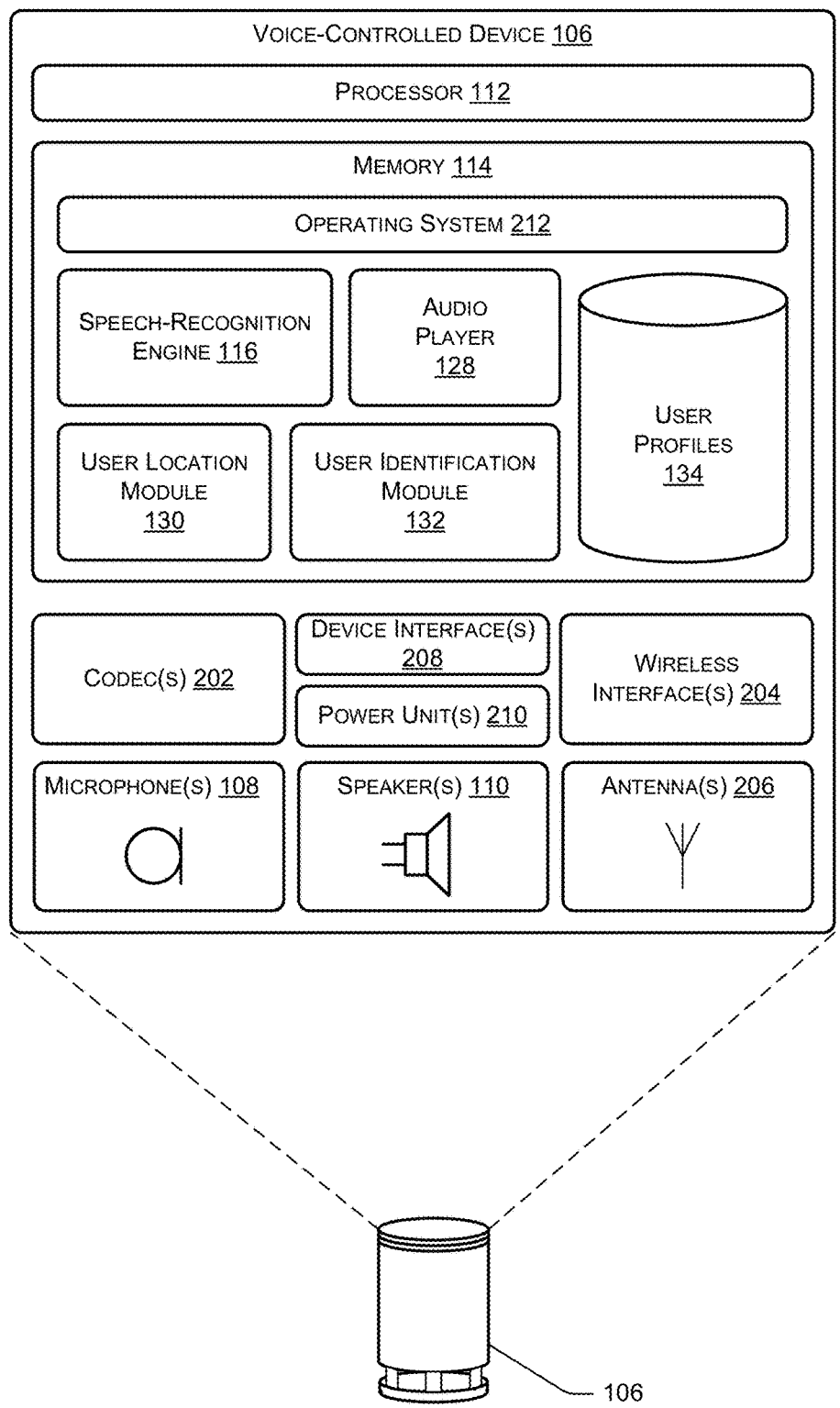
FIG. 2 is a block diagram of selected functional components implemented in the voice-controlled device of FIG. 1.

FIG. 2 shows selected functional components and/or modules of one implementation of the voice-controlled device 106 in more detail. Generally, the voice-controlled device 106 may be implemented as a standalone device 106 that is relatively simple in terms of functional capabilities with limited input/output components, memory 114 and processing capabilities. For instance, the voice-controlled device 106 may not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 may include the processor 112 and memory 114. The memory 114 may include computer-readable storage media ("CRSM"), which may be any available physical media accessible by the processor 112 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 may include a microphone unit that comprises microphones 108 to receive audio input, such as user voice input, a reference sound, and/or other noise. The device 106 also includes a speaker unit that includes the speaker(s) 110 to output audio sounds. One or more codecs 202 may be coupled to the microphones 108 and the speaker(s) 110 to encode and/or decode the audio signals. The codec 202 may convert audio data between analog and digital formats. A user 104 may interact with the device 106 by speaking to it, and the microphones 108 may capture sound and generate an audio signal that includes the user speech. The codec 202 may encode the user speech and transfer that audio data to other components. The device 106 can communicate back to the user 104 by emitting audible statements through the speaker(s) 110. In this manner, the user 104 interacts with the voice-controlled device 106 simply through speech, without use of a keyboard or display common to other types of devices.

In the illustrated example, the voice-controlled device 106 may include one or more wireless interfaces 204 coupled to one or more antennas 206 to facilitate a wireless connection to a network. The wireless interface 204 may implement one or more of various wireless technologies, such as Wi-Fi, Bluetooth, RF, and so on.

One or more device interfaces 208 (e.g., USB, broadband connection, etc.) may further be provided as part of the device 106 to facilitate a wired connection to a network, or a plug-in network device that communicates with other wireless networks. One or more power units 210 may further be provided to distribute power to the various components of the device 106.

The voice-controlled device 106 may be designed to support audio interactions with the user 104, in the form of receiving voice commands (e.g., words, phrase, sentences, etc.) from the user 104 and outputting audible feedback to the user 104. Accordingly, in the illustrated implementation, there are no or few haptic input devices, such as navigation buttons, keypads, joysticks, keyboards, touch screens, and the like. Further there may be no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., light emitting diodes (LEDs) around perimeter of a top portion of the device 106) to indicate a state such as, for example, when power is on or to indicate when a command is received. But, otherwise, the device 106 may not use or need to use any input devices or displays in some instances.

Several modules such as instructions, datastores, and so forth may be stored within the memory 114 and configured to execute on the processor 112. An operating system 212 may be configured to manage hardware and services (e.g., wireless unit, codec, etc.) within, and coupled to, the device 106 for the benefit of other modules.

In addition, the memory 114 may include the speech-recognition engine 116, the audio player 128, the user location module 130, the user identification module 132 and the user profiles 134. The memory 114 may also include the beamforming module 138, the echo cancellation module 140, the noise reduction module 142, the beam rejection module 144 and/or the beam selection module 146. Also as discussed above, some or all of these engines, data stores, and components may reside additionally or alternatively at the remote computing resources 118, described with reference to FIG. 1.

Figure 3A:
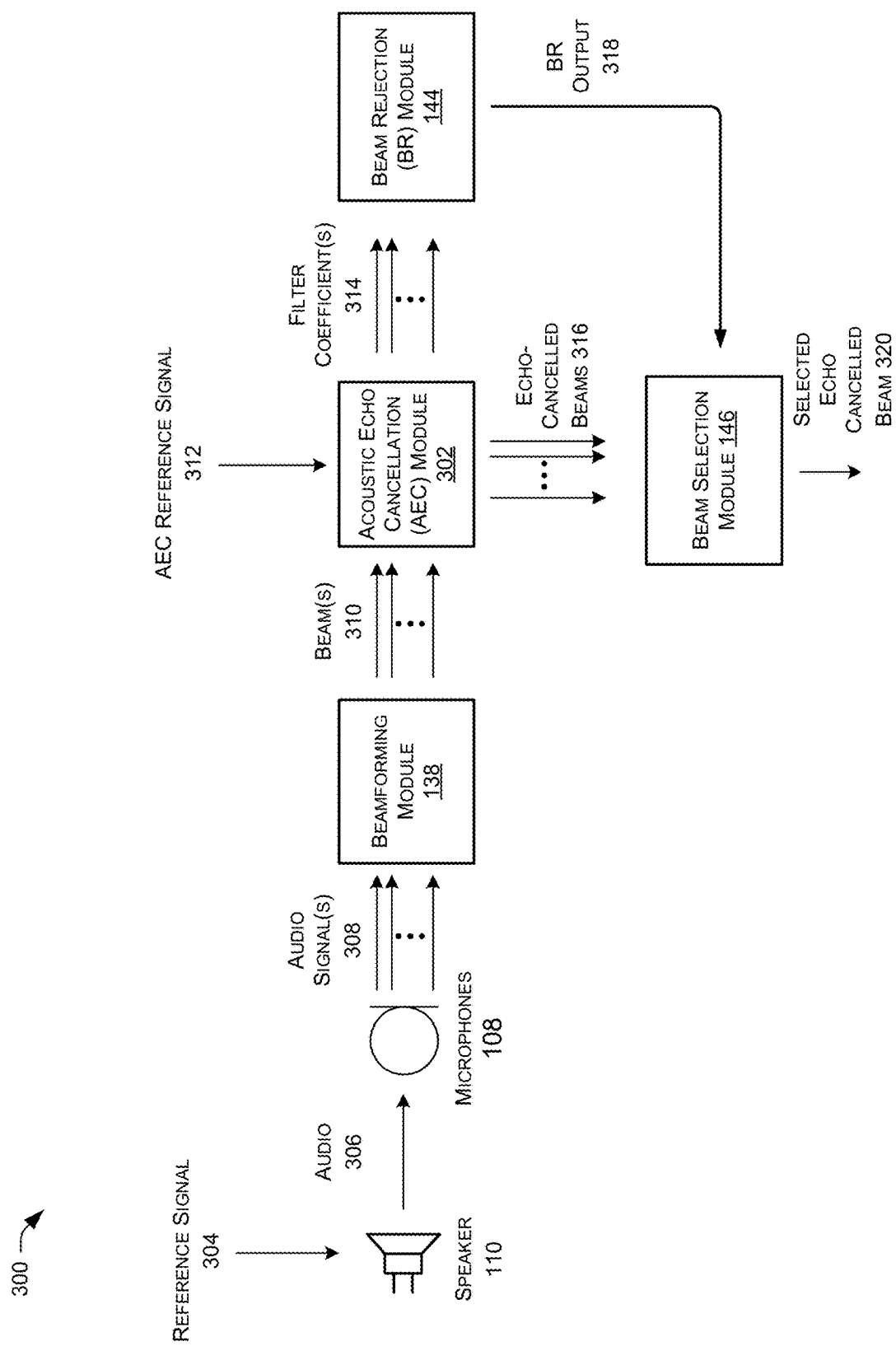
FIGS. 3A-3C are block diagrams of illustrative systems for performing beamforming, acoustic echo cancellation, and beam rejection with respect to an audio signal.
Figure 3B:
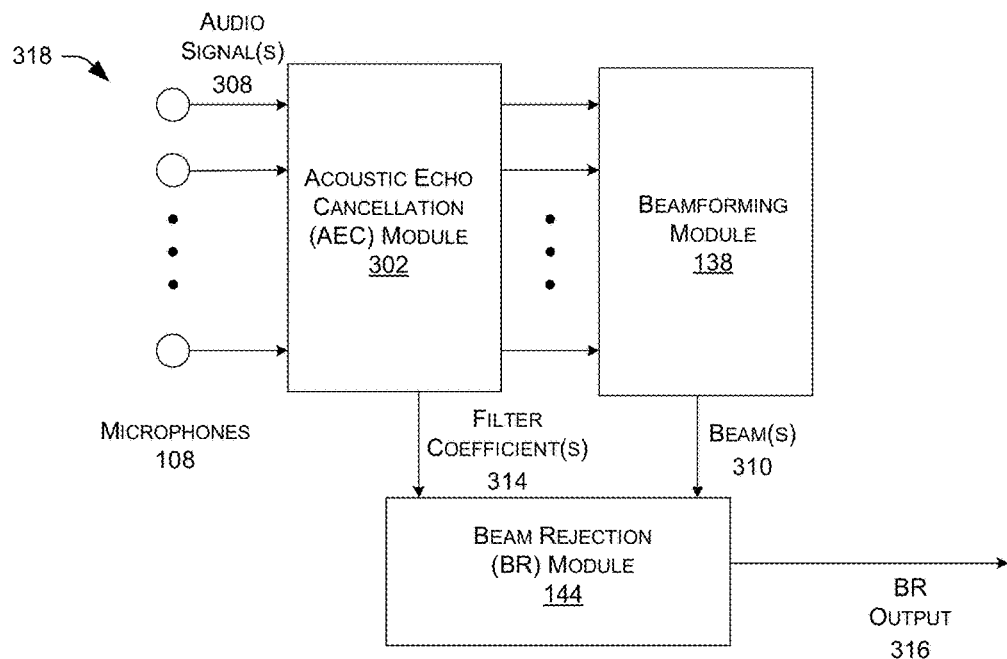
Figure 3C:
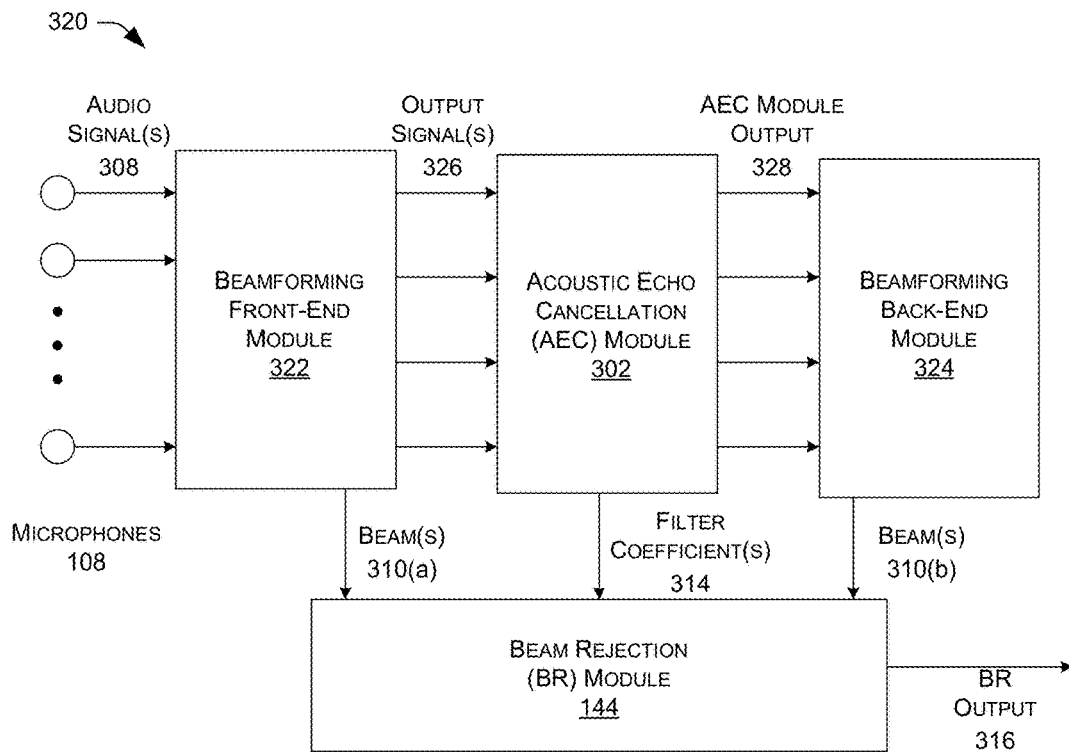

FIGS. 3A-3C are block diagrams of illustrative systems for performing beamforming, acoustic echo cancellation, and beam rejection with respect to an audio signal. In response to detecting or capturing audio within the environment 102, the systems of FIGS. 3A-3C may perform beamforming, acoustic echo cancellation (AEC), and beam rejection (BR) to at least temporarily disable or disqualify a beam from use. As a result, the systems may select a beam corresponding to a beam that is closest to a user that is speaking, or otherwise perform beam selection from beams that are not disabled or disqualified. In various embodiments, the processes illustrated in FIGS. 3A-3C may be performed by the voice-controlled device 106.

FIG. 3A is a block diagram of an illustrative system 300 for performing beamforming, acoustic echo cancellation, and then beam rejection with respect to an audio signal. As shown, the system 300 may include the speaker(s) 110, the microphone(s) 108, the beamforming module 138, an acoustic echo cancellation module 302, and the beam rejection module 144. The system 300 may be used in a calibration mode where the speaker(s) 110 of the device 106 plays audio corresponding to a known reference signal 304. The known reference signal 304 may have acoustical properties that are beneficial for the calibration process. For example, the reference signal 304 may be similar to an impulse or a chirp. In some instances, the reference signal 304 may be part (e.g., an audio segment or an audio clip) of another audio signal, such as a portion of an audio signal that causes music to be played by the device 106. Thus, the calibration mode (e.g., the reference signal 304 and a resulting reference sound) may not be identifiably by the user 104. In a calibration mode, the device 106 may play audio 306 of the reference signal through the speaker(s) 110.

The microphones 108 may detect and/or capture the audio 306 of the reference signal 304, which may include a direct path between the speaker and the microphones as well as reflective paths where the audio of the reference signal reflects off one or more reflective surfaces before being captured by the microphones. The microphones 108 may output audio signal(s) 308 that correspond to the direct and reflective paths of the audio 306 of the reference signal 304 generated by the speaker(s) 110. In some embodiments, the system 300 may be used during general operation of the device 106. For example, a user may be playing music on the device, and the microphones will capture direct and reflective paths of the music being played.

In response to capturing the sound and outputting the audio signal(s) 308, the beamforming module 138 may perform beamforming or spatio-temporal filtering techniques on the audio signal(s) 308 to generate beamformed signal(s) 310 that select audio in different directions. Subsequently, acoustic echo cancellation and beam rejection may be performed with respect to each one of the beams 310 output by the beamforming module 138. For the purposes of this discussion, beamforming may correspond to a signal processing technique for directional signal transmission or reception. In some embodiments, beamforming may be associated with a sensor array or a phased array, which may be an array of sensors (e.g., antennas) in which the relative phases of signals associated with the sensors are varied such that the pattern of the array is reinforced in a desired direction and suppressed in undesired directions. More particularly, the elements in a phased array may be combined in such a way that signals at particular angles experience constructive interference, while other signals experience destructive interference. In further embodiments, adaptive beamforming may be utilized to detect and estimate a signal-of-interest (e.g., a particular voice) at the output of a sensor array, such as by using optimal (e.g., least-squares) spatio-temporal filtering and interference rejection. In addition, adaptive beamforming may adjust its performance with respect to differences detected within an environment. The beamforming module may use any beamforming techniques known to one of skill in the art including a fixed beamforming techniques and adaptive beamforming techniques.

The beamforming module 138 may isolate sound arriving from particular directions, but the beamforming module 138 does not perform echo cancellation of the audio within the beams. Acoustic echo may correspond to when the audio 306 is output from the speaker(s) 110 (e.g., reference sound, etc.) and then captured by the microphones 108. The acoustic echo may pose difficulties in performing speech recognition of a command spoken by a user. The acoustic echo cancellation module 138 may detect the acoustic echo traveling a direct path from the speaker(s) 110 to the microphone 108 and an acoustic echo traveling in a reflective path (e.g., sound that is reflected off a reflective surface) from the speaker(s) 110 to the microphone 108.

The acoustic echo cancellation module 302 may reduce, cancel, or eliminate acoustic echo that is associated with the beamformed signal(s) 310. In some embodiments, the acoustic echo cancellation module 302 may reduce or cancel the acoustic echo based at least in part on an AEC reference signal 312 that may be the same as the reference signal 304 used to generate the audio 306 using the speaker(s) 110 or may be a modified reference signal based on the reference signal 304.

For the purposes of this discussion, acoustic echo may correspond to sound and/or a reflection of sound that arrives at the microphones after the sound was output by a speaker. Acoustic echo arises when sound from the speaker(s) 110 (e.g., a loudspeaker) is captured by the microphone 108 (or any of the microphones 108) that is in close proximity to the speaker(s) 110 (e.g., within the same room, part of the same device, etc.).

In various embodiments, the acoustic echo cancellation module 302 may first capture an audio signal corresponding to output by the speaker(s) 110 of the voice-controlled device 106 as the audio signal re-appears. The output of the speaker(s) 110 may be based on a reference signal. The audio signal corresponds to the direct path and possible reflective paths of the output of the speaker. The characteristics of the audio signal may depend at least in part on the sensitivity of the microphone 108 that is capturing the sound, the volume of the sound generated by the speaker(s) 110, and/or the positions of the microphone 108 relative to the speaker(s) 110.

The acoustic echo cancellation module 302 may then compare the audio signal to the reference signal by performing operations that generate filter coefficient(s) 314. The filter coefficients may be used to subtract the reference signal from the audio signal. A resulting signal may represent audio present within the environment 102 that generally excludes any, or at least reduces the amount of, direct or reflective sound generated by the speaker(s) 110 of the voice-controlled device 106. That is, echo cancellation may involve first recognizing the reference signal that re-appears, with some delay, in the received audio signal. Once the reference signal is recognized, it may be removed by subtracting it from the received audio signal(s). In some embodiments, acoustic echo cancellation may be implemented using a digital signal processor (DSP) and/or one or more algorithms.

The acoustic echo cancellation module 302 may output the filter coefficient(s) 314 in addition to other possible outputs, such as an echo-cancelled signal for each of the beamformed signal(s) 310. The filter coefficient(s) 314 may then be processed by the beam rejection module 144.

In the event that acoustic noise associated with the audio signal(s) 308 exists after acoustic echo cancellation is performed by the acoustic echo cancellation module 302, the device 106 may employ other techniques performed by other modules, such as the noise reduction module 142, to reduce or cancel noise associated with the audio signal(s) 308 and/or other noise within the environment 102. Other noise may include ambient or background noise, such as voices of other users 104, audio signals output by other devices within the environment 102, etc.

The beam rejection module 144 may receive the filter coefficient(s) 314 corresponding to each of echo-cancelled signal(s) 316 generated by the AEC module 302. The beam rejection module 144 may analyze the filter coefficient(s) 314 to determine whether a reflective surface is within a threshold distance from the device 106 in the direction of the corresponding beamformed signal. In various embodiments, the beam rejection module 144 may process the filter coefficient(s) 314 for each of the echo-cancelled signal(s) 316 to determine the number peaks and their amplitudes. The beam rejection module 144 may use the time delay between the peaks and the amplitude of the peaks to determine the prominence and distance of a reflective surface in the direction of the corresponding beamformed signal. The beam rejection module 144 may generate a BR output 318 that is sent to the beam selection module 146 that, in response to receipt of the signal, excludes at least one beam from use when employing beam selection logic to select a beam for further processing. Thus, the BR output 318 may include a distance between the device 106 and a reflective surface (if any), a time delay between peaks (if any), and/or a determination as to whether to exclude, deactivate or disregard, at least temporarily, a beam. In some embodiments, the beam selection module 146 may cause exclusion of one or more beams, at least temporarily, from use in certain circumstances based on the prominence and distance of the reflective surface in the direction of the beams. The beam selection module 146 may output a selected echo-cancelled beam 320.

FIG. 3B is a block diagram of an illustrative system 318 for performing acoustic echo cancellation prior to beamforming, and then beam rejection with respect to an audio signal. For audio processing solutions that use beamforming and acoustic echo cancellation, it is not necessary that the beamforming by the beamforming module 138 always precede the processing by the AEC module 302. In FIG. 3B, the audio signals 308 from the microphones 108 are first processed by the AEC module 302. The number of channels processed by the AEC module may be equal to the number of the microphones 108. The output of the AEC module 302 is then processed by the beamforming module 138. The filter coefficients 314 output by the AEC module 302 and the beamformed signals 310 output by the beamforming module 138 may be processed by the BR module 144, as discussed above.

FIG. 3C is a block diagram of an illustrative system 320 for performing front-end beamforming, acoustic echo cancellation, back-end beamforming, and then beam rejection with respect to an audio signal. Thus, the beamforming may be performed by a beamforming front-end module 322 and a beamforming back-end module 324. In system 318 shown in FIG. 3B, the number of channels processed by the multichannel AEC may be equal to the number of beam-formed signals. However, this may cause the AEC module to incur high computational cost when the number of beams is increased. As shown in FIG. 3C, a beamformer algorithm is divided into two parts: a beamforming front-end and a beamforming back-end. An example of such a beamformer is the polynomial beamformer. The beamformer front-end processes the audio signals 308 and provides a minimum number of output signals 326 that result in desirable overall beamforming performance (after combining the front-end and back-end processing of the beamformer). In some embodiments, the number of the output signals 326 of the beamforming front-end is less than the number of the microphones 108; thus, the beamforming front-end processing may provide a dimensionality reduction process. The AEC module 302 may process the output signals 326 of the beamforming front-end module 322. Thereafter, the beamforming back-end module 324 may process an AEC module output 328 of the AEC module. The filter coefficients 314 output by the AEC module 302 and the beams 310, including beams 310(a) and/or beams 310(b), output by the beamforming module 138 may be processed by the BR module 144, as discussed above.

Figure 4:
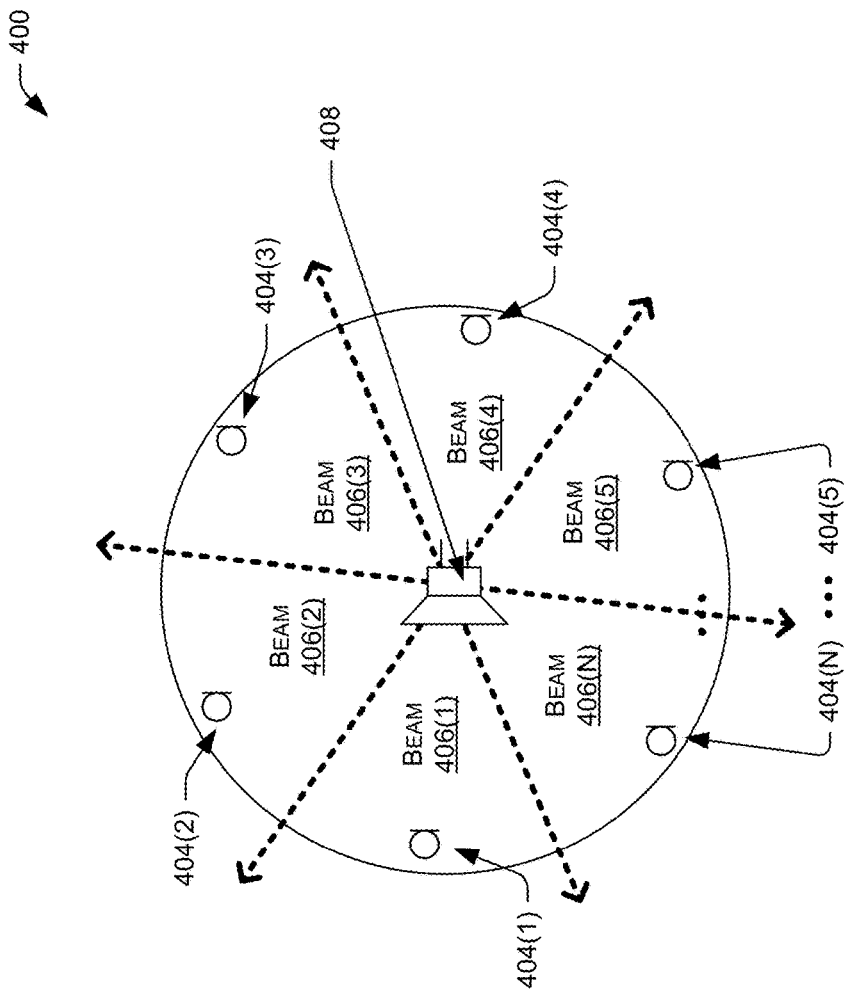
FIG. 4 is a schematic diagram of an illustrative voice-controlled device in a reverberant environment that includes a reflective surface near the device.
Figure 4:
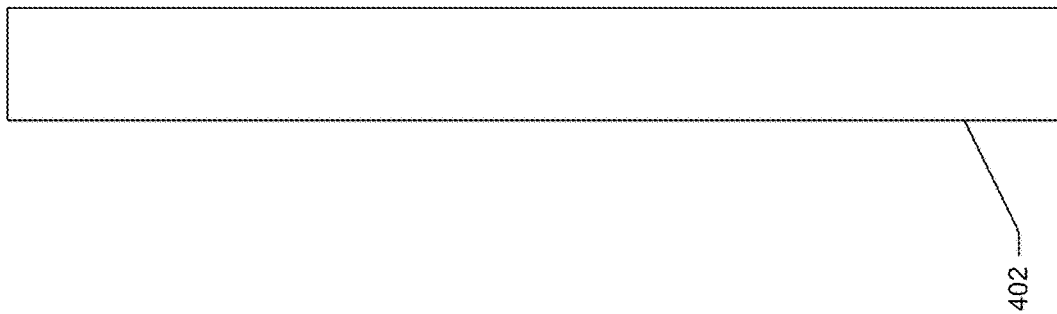

FIG. 4 is a schematic diagram of the illustrative voice-controlled device ("device") 400 in a reverberant environment that includes a reflective surface 402 near the device 400. The reflective surface 402 may be any surface that can reflect sound, such as a wall, a window, a bookcase, a partition, a chair, and so forth. The device 400 may be a same or similar device as the voice-controlled device 106. The device 400 may include a plurality of microphones 404 (e.g. a microphone array), which may be located near a perimeter of the device 400 or possibly in other locations. Although the device 400 shows six microphones, more or fewer microphones may be used. Each microphone 404(1), . . . , 404(N) may have an associated beam 406 (beams 406(1), . . . , 406(N)), which may be created by the beamforming module 138 as discussed above.

As shown in FIG. 4, illustrative representations of the beams 406 are shown as wedge shapes defined between dotted lines. These illustrative representations are shown for explanation purposes only. The beams 406 may overlap and/or have other shapes or profiles depending on the type of microphones 404, the direction of the microphones 404, and/or other factors. The beams 406 may be directed in particular directions. The device 400 may include at least one speaker 408, which may be centrally located in the device 400 such that the microphones 404 are located between the speaker 408 and a lateral sidewall of the device 400. However, other design configurations may also be employed to create the device 400. The speaker 408 may generate a reference sound that is captured by the microphones via a direct path, and captured by some microphones via a reflection path after the reference sound reflects off of the reflective surface 402 as shown in greater detail in FIG. 5. The microphones 404 convert the captured sound into an audio signal that is then processed by the beamforming module to create beamformed signals. The beamformed signals are then processed as described below.

Figure 5:
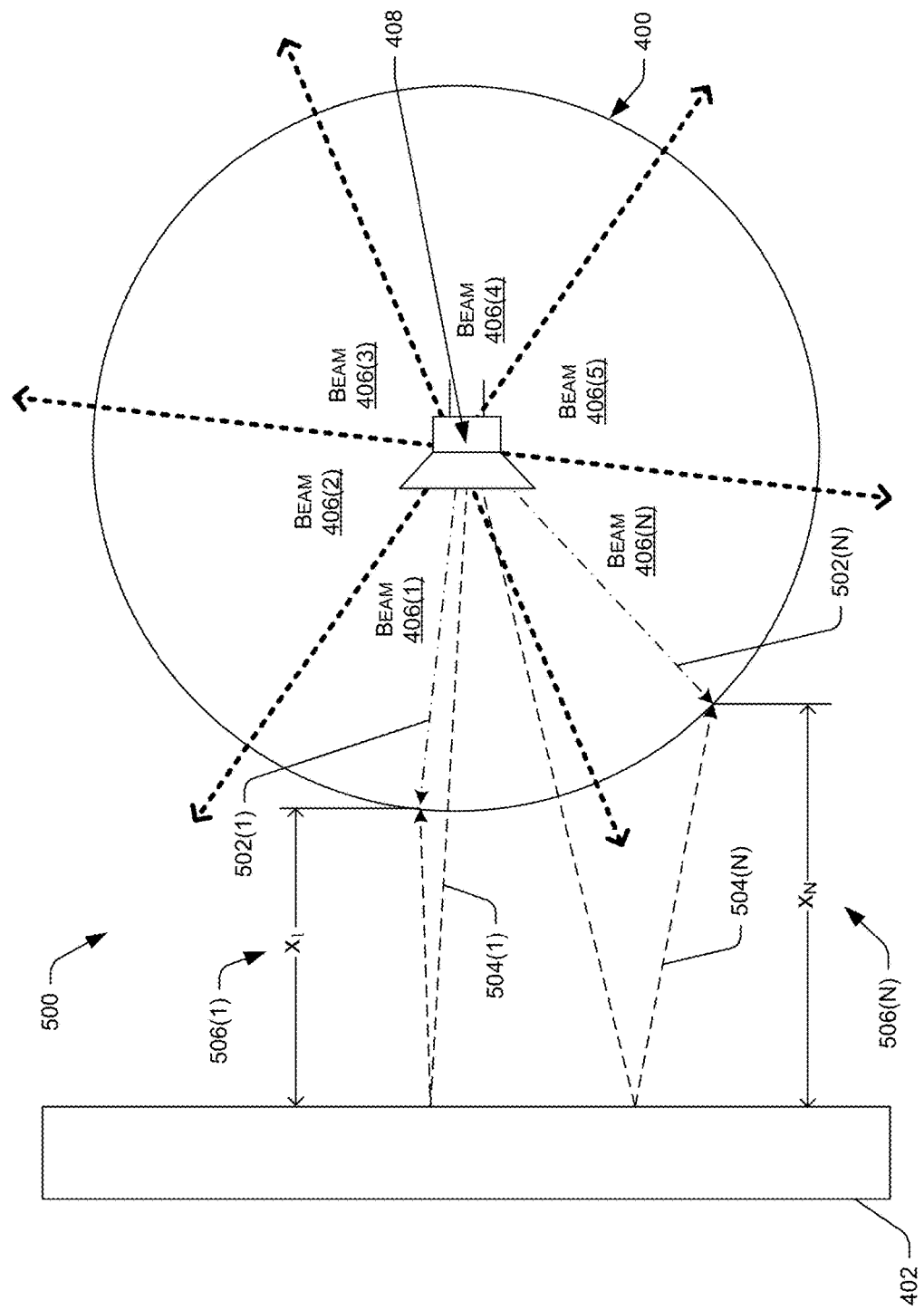
FIG. 5 is a schematic diagram of the illustrative voice-controlled device from FIG. 4 showing reflections of sound off of the reflective surface near the device.

FIG. 5 is a schematic diagram of the illustrative voice-controlled device 400 from FIG. 4 showing illustrative travel of sound 500 that includes reflections of the sound off of the reflective surface 402 near the device 400. The travel of the sound 500 is shown in FIG. 5 via a direct path 502, which does not include a reflection of sound involving the reflective surface 402, and a reflective path 504, which does include a reflection of sound involving the reflective surface 402. The paths illustrated in FIG. 5 are shown for illustrative purposes to show relative direction of travel of sound from the speaker 408 to a beam formed by the beamforming module 138. The sound 500 may be a known reference sound that is generated by the speaker 408.

As shown in FIG. 5, the sound 500 may travel in a first direct path 502(1) from the speaker 408 to a first beam 406(1) and in another direct path 502(N) from the speaker 408 to another beam 406(N). When the microphones used to create the beams 404(1) and 404(N) are equidistant from the speaker 408, then the beams may capture the sound 500 at the same time via the direct paths 502 because the direct paths 502 have the same distance.

When the reflective surface 402 is present and near the device 400, some of the sound 500 generated by the speaker 408 may be reflected off of the reflective surface 402 and captured by the beams after the sound 500 traveling along the direct path 502 is captured by the beams 406. As shown in FIG. 5, the sound 500 may travel in a first reflective path 504(1) from the speaker 408 to the reflective surface 402 and then back to the first beam 406(1) and in another reflective path 504(N) from the speaker 408 to the reflective surface 402 and then back to the other beam 406(N). The distances of the reflective paths 504 may be different depending on the location of the reflective surface 402 in relation to the device 400 and beams 406(1) and 406(N). As shown in FIG. 5, the first reflective path 504(1) is shorter than the other reflective path 504(N).

Because the beamforming module 138 applies direction of arrival filters, the beamforming module 138 may capture the reflective sound 504 within some beams, such as the beam 406(1), but not for other beams, such as the beam 406(4). This may allow the beamforming module 138 to filter out the reflective sound for beams that are not facing in the direction of the reflective surface.

As discussed with reference to FIGS. 3A-3C, the AEC module 302 may create filter coefficients for each of the beams 406. The filter coefficients may include peaks that indicate the capture of the sound 500 along the direct path 502 and the reflective path 504. Although only one reflective path is discussed, multiple reflective paths may be present when multiple reflective surfaces are present near the device 400.

The beam rejection module 144 may analyze the filter coefficients, as discussed below with reference to FIGS. 6A and 6B, to determine whether the reflective surface 402 is near the device in the direction of the corresponding beam. As shown in FIG. 5, the device is a first distance $x_1$ 506(1) from the reflective surface 402 in the direction of beam 406(1) and the device is a second distance $x_2$ 506(N) from the reflective surface 402 in the direction of beam 406(N).

Figure 6A:
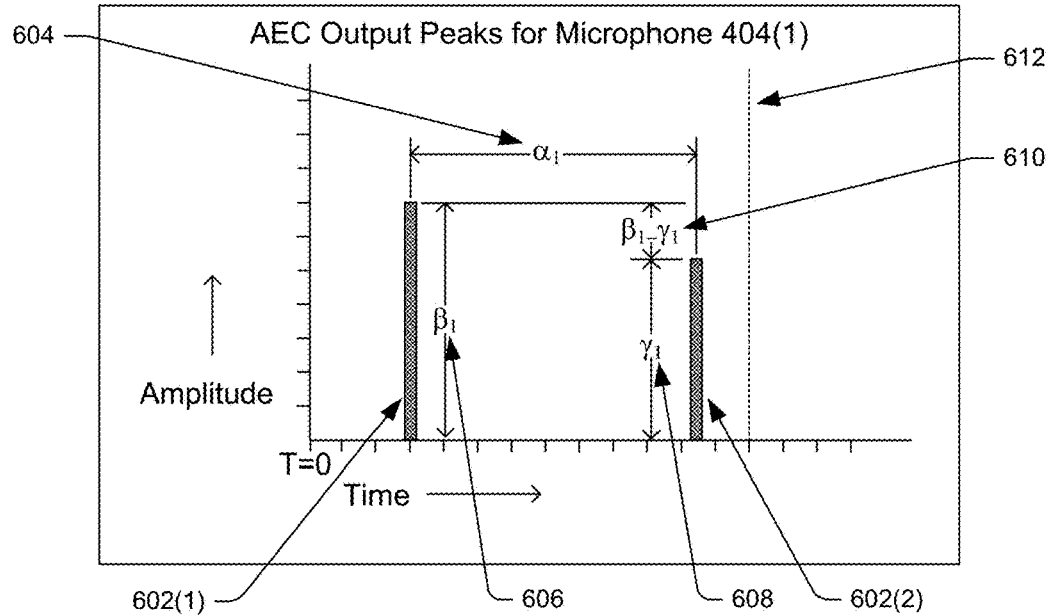
FIGS. 6A and 6B are illustrative graphs that depict acoustic echo cancellation data derived from sound captured by microphones of the voice-controlled device.
Figure 6B:
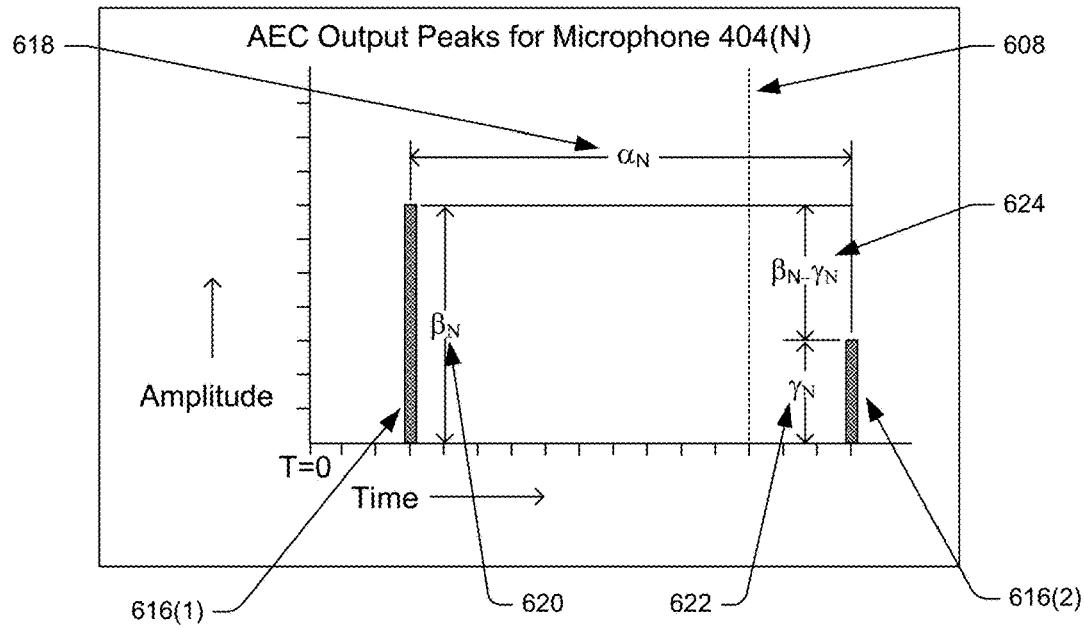

FIGS. 6A and 6B show illustrative graphs that depict sample acoustic echo cancellation filter coefficients derived from sound captured by one of multiple beams of the voice-controlled device 106, and are described with reference to FIG. 5. The graphs show data plotted with respect to time. The reference sound 500 is generated at time=0 in the following examples. Although filter coefficients computed from real data may be more complex than shown in FIGS. 6A and 6B, the data shown has been simplified to facilitate explanation.

FIG. 6A shows a graph 600 that includes peaks 602 that represent sound captured by the first beam 406(1). The peaks 602 may represent an amplitude or other measure of the sound 500 captured by the first beam 406(1), which is identifiable because the sound 500 is a reference sound having known characteristics of a reference signal. The peaks 602 may be generated based on the filter coefficients created by the AEC module 138. The graph 600 shows a first peak 602(1) that corresponds to a capture of sound traveling along the direct path 502(1). Similarly, a second peak 602(2) corresponds to a capture of sound traveling along the reflective path 504(1).

As shown in FIG. 6A, the first peak 602(1) is separated from the second peak 602(2) by a time delay $\square_1$ 604. The first peak 602(a) includes an amplitude $\square_1$ 606 while the second peak 602(2) includes an amplitude $\square_1$ 608. Thus, the difference in the amplitudes of the first peak 602(1) and the second peak 602(2) is $\square_1$-$\square_1$ 610 because the reflective surface may absorb some of the sound generated by the speaker 408 or for other reasons. The time delay $\square_1$ 604 corresponds to the difference between the length of the direct path and the reflective path. Thus, by determining the time delay $\square_1$ 604, the beam rejection module 144 may determine whether the device is located near the reflective surface 402 in the direction of beam 406(1). In some embodiments, the beam rejection module 144 may determine whether the device is located within a threshold distance from the reflective surface 402 in the direction of beam 406(1) by comparing the location of the second peak 602(2) to a threshold time 612. The threshold time 612 may be a time after the first peak 602(1) or a time after the generating of the sound. In this example, beam rejection module 144 may determine that the reflective surface 402 is within the threshold distance because the second peak 602(2) occurs before the threshold time 612, and thus may designate the first beam 406(1) to be excluded from use, at least temporarily. In various embodiments, the beam rejection module 144 may determine whether the second peak 602(2) includes an amplitude that indicates the prominence of a reflective surface (e.g., the size of the reflective surface, the level of reflectivity as opposed to an absorption). Thus, the amplitude $\square_1$ 608 of second peak 602(2) may be compared to an amplitude threshold value, the amplitude $\square_1$ 608 may be compared to the amplitude $\square_1$ 606 with respect to a threshold value (e.g., difference, ratio, percent comparisons, etc.), and/or other comparisons may be made to determine whether the amplitude $\square_1$ 608 indicates the prominence of a reflective surface.

FIG. 6B shows a graph 614 that includes peaks 616 that represent sound captured by the beam 406(N). The peaks 616 may represent an amplitude or other measure of the sound 500 captured by the other beam 406(N), which is identifiable because the sound 500 is a reference sound having known characteristics of a reference signal. The peaks 616 may be generated based on the filter coefficients created by the AEC module 138. The graph 614 shows a first peak 616(1) that corresponds to a capture of sound traveling along the direct path 502(N). Similarly, a second peak 616(2) corresponds to a capture of sound traveling along the reflective path 504(N).

As shown in FIG. 6B, the first peak 616(1) is separated from the second peak 616(2) by a time delay $\square_N$ 618. The first peak 616(a) includes an amplitude $\square_N$ 620 while the second peak 616(2) includes an amplitude $\square_N$ 622. Thus, the difference in the amplitudes of the first peak 602(1) and the second peak 616(2) is $\square_N$-$\square_N$ 6124 because the reflective surface may absorb some of the sound generated by the speaker 408 or for other reasons. The time delay $\square_N$ 618 corresponds to the difference between the length of the direct path and the reflective path. Thus, by determining the time delay $\square_N$ 618, the beam rejection module 144 may determine whether the device is located near the reflective surface 402 in the direction of beam 406(N). In some embodiments, the beam rejection module 144 may determine whether the device is located (formed) within a threshold distance from the reflective surface 402 in the direction of beam 406(N) by comparing the location of the second peak 616(2) to the threshold time 608. The threshold time 608 may be a time after the first peak 616(1) or a time after the generating of the sound. In this example, beam rejection module 144 may determine that the reflective surface 402 is not within the threshold distance because the second peak 616(2) occurs after the threshold time 608, and thus may not designate the other beam 406(N) to be excluded from use, at least temporarily. In various embodiments, the beam rejection module 144 may determine whether the second peak 616(2) includes an amplitude that indicates the prominence of a reflective surface (e.g., the size of the reflective surface, the level of reflectivity as opposed to an absorption). Thus, the amplitude $\square_N$ 622 of second peak 616(2) may be compared to an amplitude threshold value, the amplitude $\square_N$ 622 may be compared to the amplitude $\square_N$ 620 with respect to a threshold value (e.g., difference, ratio, percent comparisons, etc.), and/or other comparisons may be made to determine whether the amplitude $\square_N$ 622 indicates the prominence of a reflective surface.

Figure 7:
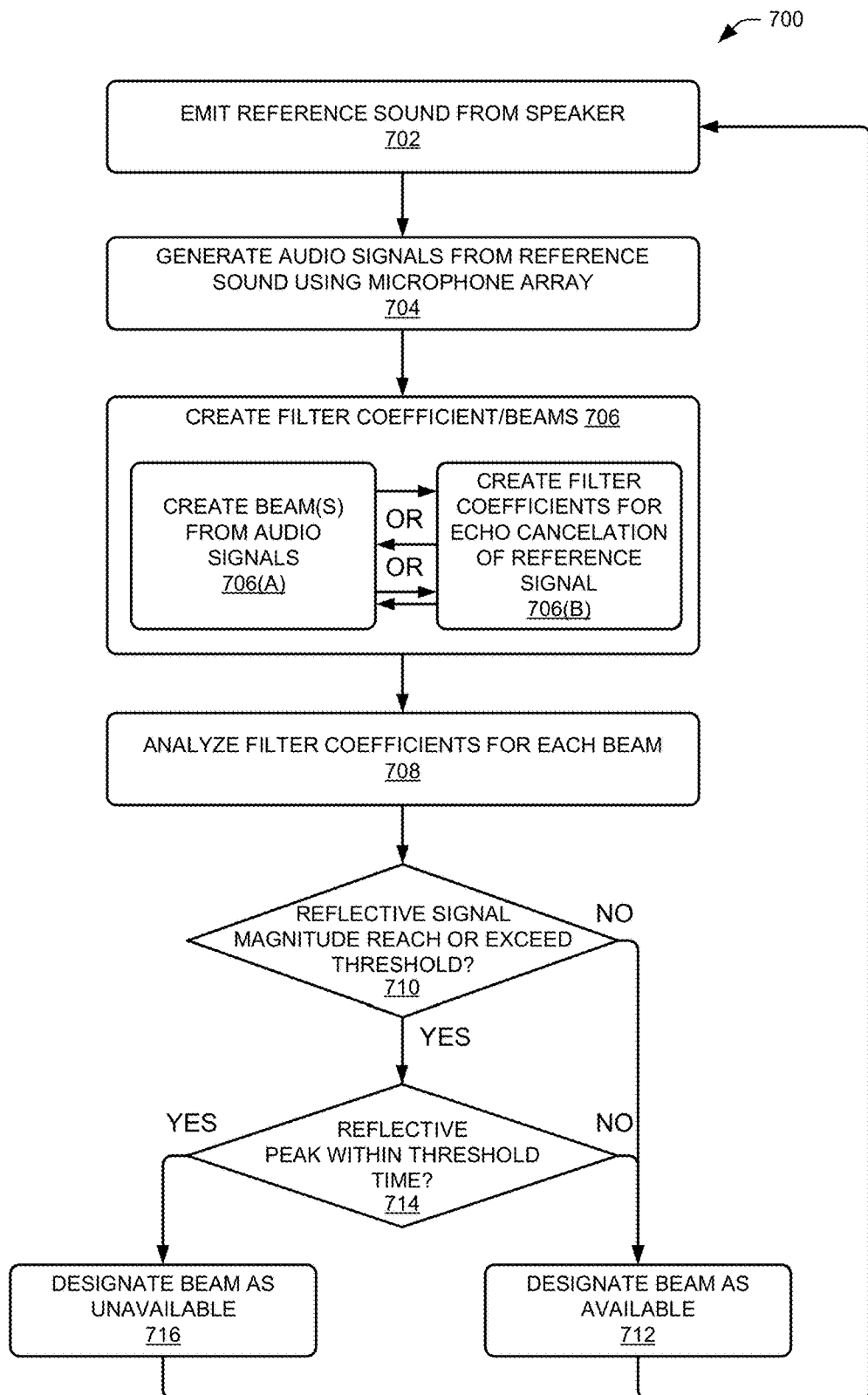
FIG. 7 is a flow diagram of an illustrative process to identify a beam of a device that is near or directed toward a reflective surface.
Figure 8:
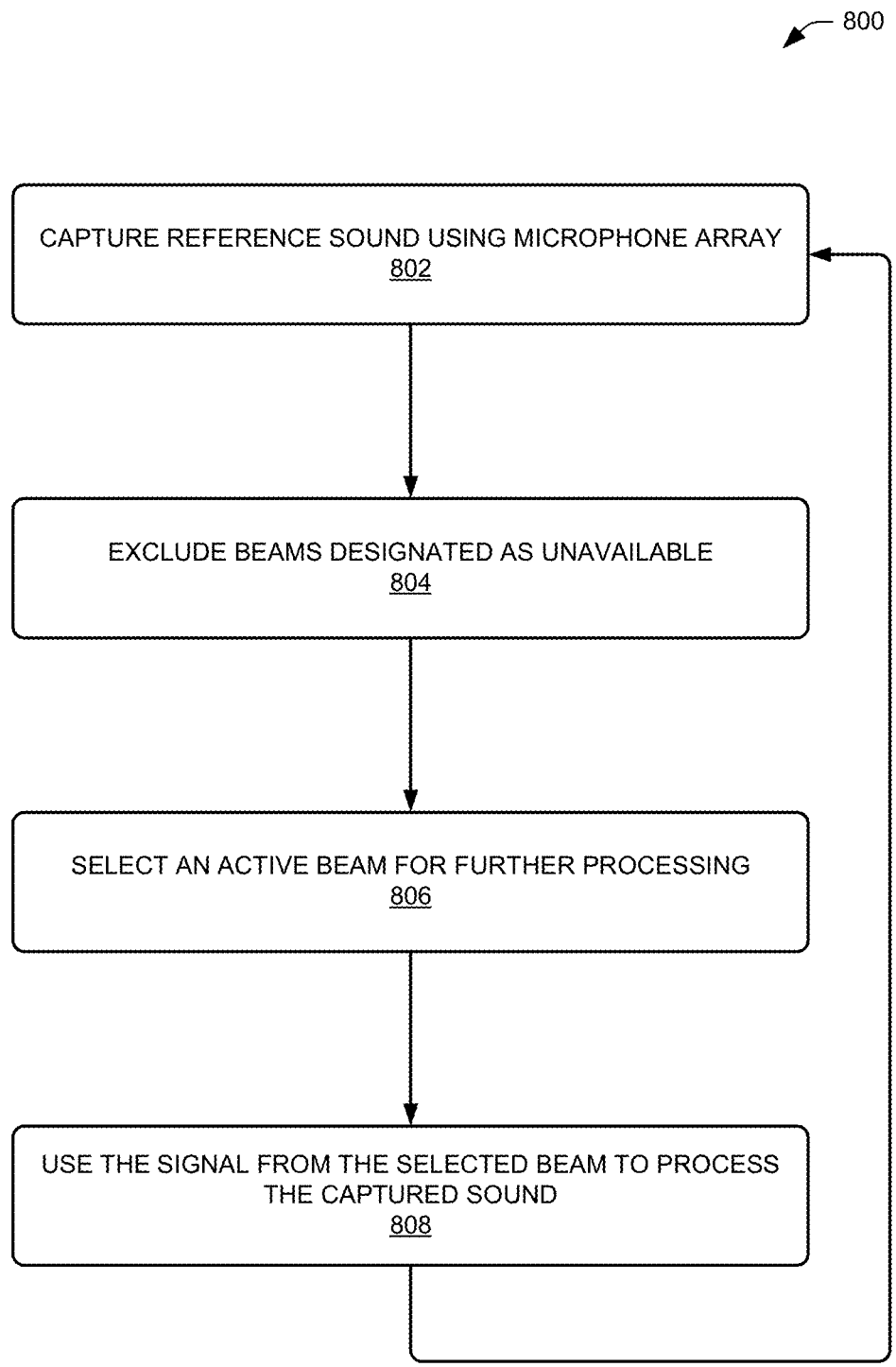
FIG. 8 is a flow diagram of an illustrative process to manage selection from multiple beams of the voice-controlled device.

FIGS. 7 and 8 show illustrative processes illustrated as logical flow graphs, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

FIG. 7 is a flow diagram of an illustrative process 700 to identify a beam of the device 106 that is directed toward a reflective surface. The voice-controlled device 106, the remote computing resources 118, other computing devices or a combination thereof may perform some or all of the operations described below. The process 700 may be performed for each beam formed by the device 106.

At 702, the speaker 110 of the device 106 may generate a reference sound. The reference sound may be a portion of other sounds (part of a music audio clip, etc.) or may be a specified sound. Thus, in some instances, the reference sound may not be distinguishable by users of the device 106 from other sounds generated by the speaker.

At 704, a microphone array may capture the reference sound, which may travel in the direct path as well as one or more reflective paths due to reflection off of one or more reflective surfaces. The microphone array may generate audio signals from the captured reference sound.

At 706, the beamforming module 138 and the acoustic echo cancellation module 140 may process the audio signals to create echo cancellation filter coefficients and beamformed signals. The audio signals may also be preprocessed before beamforming and echo cancellation so that the beamforming module 138 and the acoustic echo cancellation module 140 may process signals derived from the audio signals instead of the audio signals. As discussed above, the device 106 may form the beams and then create the filter coefficients (e.g., as shown in FIG. 3A), create the filter coefficients and then form the beams (e.g., as shown in FIG. 3B), or use a segmented approach where the beams are partially formed before and after the creation of the filter coefficients (e.g., as shown in FIG. 3C). For illustrative purposes, an operation 706(A) shows creation of the beamformed signals by the beam forming module 138 while an operation 706(B) shows creation of filter coefficients for echo cancelation of the reference signal.

At 708, the beam rejection module 144 may analyze the filter coefficients to determine a time between the peaks, a magnitude difference of the peaks, and/or other information corresponding to each of the beams.

At 710, the beam rejection module 144 may determine whether a peak is present that corresponds to a reflection. The beam rejection module 144 may determine that a reflective peak is present by identification of a second peak (e.g., the second peak 602(2)) associated with the reference sound). The beam rejection module 144 may determine the reflective peak is the same sound as the first sound since the characteristics of the reference signal are known by the device 106.

In some embodiments, the beam rejection module 144 may determine whether the magnitude, amplitude, or other measure of the reflective signal (corresponding to the second peak) reaches or exceeds a threshold. For example, the amplitude may be compared directly to the threshold. In some embodiments, a difference or ratio of the amplitude of the second peak in comparison to the amplitude of the first peak may be compared to the threshold. When the reflective peak is less than the threshold amount or is not present (following the "no" route from the decision operation 710), then the process 700 may advance to an operation 712 and designate the beam as available (or may use some other similar type of designation that indicates that a reflective surface is not near the device in the direction of the beam).

When the reflective peak is present and reaches or exceeds the threshold (following the "yes" route from the decision operation 710), then the process 700 may advance to a decision operation 714. At 714, the beam rejection module 144 may determine whether the delay of reflective peak is within a threshold time from the direct peak (first peak created from a direct path of the reference sound to the beam). When the reflective peak is not within the threshold time from the direct peak (following the "no" route from the decision operation 714), then the process 700 may advance to the operation 712.

When the reflective peak is within the threshold time from the direct peak (following the "yes" route from the decision operation 714), then the process 700 may advance to an operation 716. At 716, the beam rejection module 144 may designate the beam as unavailable or may use some other similar type of designation that indicates that a reflective surface is near the device in the direction of the beam. Where the beams have a fixed orientation, the beam rejection module 144 may simply reject the same beam for subsequently received audio. Where the beams have an adaptive orientation (e.g., the beams can be focused to a sound in a particular direction), the beam rejection module 144 may reject beams having substantially the same direction as the rejected beam for subsequent audio. For example, all beams with an angle within a specified number of degrees from the rejected beam, may be rejected for subsequent audio.

In some embodiments, the operations at 710 and 714 may be combined or performed in other ways. For example, instead of comparing the amplitudes to a first threshold and a time delay to a second threshold, the amplitudes and time delay may be considered jointly in determining whether a beam should be marked as unavailable. By considering the amplitudes and time delay jointly, a peak with a smaller time delay and a smaller amplitude (e.g., corresponding to a close but not prominent reflective surface) may not result in rejection of a beam. Also, a peak with a larger time delay and a larger amplitude (e.g., corresponding to a more distant reflective surface that is prominent) may cause rejection of a beam.

The process 700 may repeat via a loop. The loop may enable changes in the availability of beams, which may result from movement of the device 106, movement of reflective surfaces (e.g., the reflective surface 402), and so forth. In some embodiments, the loop may enable use of a moving average algorithm to update a status of beams.

FIG. 8 is a flow diagram of an illustrative process 800 to manage selection or a beam from multiple beams of the voice-controlled device. The process 800 may use the output of the process 700 for rejecting beams. The voice-controlled device 106, the remote computing resources 118, other computing devices or a combination thereof may perform some or all of the operations described below.

At 802, the device 106 may capture a reference sound using two or more beams.

At 804, the beam rejection module 144 may exclude beams designated as unavailable. For example, the beam rejection module 144 may transmit a signal to the beam selection module 146 to indicate that a particular beam of the device is directed toward a reflective surface (e.g., a wall, etc.) and should not be used, at least temporarily, to capture sound or for other purposes.

At 806, the beam selection module 146 may select an active beam for further processing. The active beam may be selected from beams designated as available (or not designated as unavailable). The active beam may be selected based on desired attributes such as a beam having a highest or maximum energy, a beam having a highest speech signal-to-noise ratio, and/or based on other attributes.

At 808, the speech-recognition engine 116 or another module may use the signal from the beam selected at the operation 806 to process the captured sound. The process 800 may repeat in a loop so that other beams may be selected for subsequently received audio.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   receiving speech input at a first microphone and at a second microphone;
   causing one or more light elements to illuminate according to a predetermined configuration corresponding to the speech input;
   generating, using the first microphone, first audio data representing the speech input;
   generating, using the second microphone, second audio data representing the speech input;
   processing the first audio data to generate first echo-canceled data;
   processing the second audio data to generate second echo-canceled data;
   sending at least one of a first portion of the first echo-canceled data or a second portion of the second echo-canceled data to a remote computing resource;
   receiving, from the remote computing resource, data corresponding to the speech input; and
   causing one or more loudspeakers to output the data.

2. The method of claim 1, wherein the predetermined configuration comprises a first predetermined configuration, the method further comprising causing the one or more light elements to illuminate according to a second predetermined configuration corresponding to the data.

3. The method of claim 1, wherein the first microphone and the second microphone are associated with a device, the method further comprising sending an identifier of the device to the remote computing resource, wherein the remote computing resource is configured to process the first portion of the first echo-canceled data or the second portion of the second echo-canceled data based at least in part on the identifier.

4. The method of claim 1, wherein the predetermined configuration comprises at least one of:
   turning on and off at least one light element of the one or more light elements; or
   displaying one or more colors using the one or more light elements.

5. The method of claim 1, wherein generating the first audio data and generating the second audio data is based at least in part on the speech input including a keyword.

6. The method of claim 1, further comprising:
   processing the first audio data to generate a first beamformed signal; and
   processing the second audio data to generate a second beamformed signal,
   wherein:
      generating the first echo-canceled data is based at least in part on the first beamformed signal, and
      generating the second echo-canceled data is further based at least in part on the second beamformed signal.

7. A device comprising:
   a first microphone;
   a second microphone;
   one or more light elements;
   one or more loudspeakers;
   one or more processors; and
   one or more non-transitory computer-readable media storing computer-executable instructions that, when executed by the one or more processors, cause the one or more processors to perform acts comprising:
      receiving speech input at the first microphone and the second microphone;
      causing the one or more light elements to illuminate according to a first configuration corresponding to the speech input;
      generating, using the first microphone, first audio data representing the speech input;
      generating, using the second microphone, second audio data representing the speech input;
      processing the first audio data to generate first echo-canceled data;
      processing the second audio data to generate second echo-canceled data;
      sending a first portion of the first echo-canceled data or a second portion of the second echo-canceled data to a remote computing resource;
      receiving, from the remote computing resource, data corresponding to the speech input; and
      causing one or more loudspeakers to output the data.

8. The device of claim 7, the acts further comprising determining that the speech input includes a predefined keyword, and wherein generating the first audio data and generating the second audio data is based at least in part on the speech input including a keyword.

9. The device of claim 8, wherein causing the one or more light elements to illuminate according to the first configuration is based at least in part on determining that the speech input includes the predefined keyword.

10. The device of claim 7, the acts further comprising causing the one or more light elements to illuminate according to a second configuration corresponding to the data.

11. The device of claim 7, the acts further comprising sending an identifier of the device to the remote computing resource, wherein the remote computing resource is configured to process the first portion of the first echo-canceled data or the second portion of the second echo-canceled data based at least in part on the identifier.

12. The device of claim 7, wherein causing the one or more loudspeakers to output the data is based at least in part on one or more preferences associated with a user profile associated with the device.

13. The device of claim 7, wherein the first configuration comprises at least one of:
   turning on and off at least one light element of the one or more light elements; or
   displaying one or more colors using the one or more light elements.

14. The device of claim 7, wherein:
   the one or more light elements are arranged proximal to a top of the device; and
   the one or more loudspeakers are arranged proximal to a bottom of the device.

15. A method comprising:
   generating, using a first microphone, first audio data representing speech input;
   generating, using a second microphone, second audio data representing the speech input;
   causing one or more light elements to illuminate according to a first configuration;
   generating first echo-canceled data based at least in part on the first audio data;
   generating second echo-canceled data based at least in part on the second audio data;
   sending at least one of a first portion of the first echo-canceled data or a second portion of the second echo-canceled data to a remote computing resource;
   receiving, from the remote computing resource, data associated with a response to the speech input; and
   causing one or more loudspeakers to output the data.

16. The method of claim 15, wherein generating the first audio data and generating the second audio data is based at least in part on the speech input including a keyword.

17. The method of claim 15, wherein the first configuration comprises at least one of:
- turning on and off at least one light element of the one or more light elements; or
- displaying one or more colors using the one or more light elements.

18. The method of claim 15 wherein further comprising causing the one or more light elements to illuminate according to a second configuration based at least in part on causing the one or more loudspeakers to output the data.

19. The method of claim 15, wherein:
- the first microphone and the second microphone are associated with a first device; and
- the one or more loudspeakers are associated with a second device.

20. The method of claim 15, further comprising causing, during at least a first part of generating the first echo-canceled data or a second part of generating the second echo-canceled data, the one or more light elements to illuminate according to a second configuration.

\* \* \* \* \*